(12) United States Patent
Su et al.

(10) Patent No.: US 11,914,830 B2
(45) Date of Patent: Feb. 27, 2024

(54) METAL MESH STRUCTURE, TOUCH DISPLAY DEVICE AND MOBILE TERMINAL

(71) Applicant: Micron Optoelectronics Co., Ltd., Shenzhen (CN)

(72) Inventors: Wei Su, Shenzhen (CN); Zonghe Ye, Shenzhen (CN)

(73) Assignee: Micron Optoelectronics Co., Ltd., Shenzhen (CN)

( * ) Notice: Subject to any disclaimer, the term of this patent is extended or adjusted under 35 U.S.C. 154(b) by 0 days.

(21) Appl. No.: 17/979,952

(22) Filed: Nov. 3, 2022

(65) Prior Publication Data

US 2023/0146145 A1 May 11, 2023

(30) Foreign Application Priority Data

Nov. 5, 2021 (CN) .......................... 202111308310.6

(51) Int. Cl.
G06F 3/044 (2006.01)

(52) U.S. Cl.
CPC .......... *G06F 3/0446* (2019.05); *G06F 3/0445* (2019.05); *G06F 2203/04112* (2013.01)

(58) Field of Classification Search
CPC .... G06F 3/0446; G06F 3/0443; G06F 3/0445; G06F 2203/04112; G06F 2203/04103
See application file for complete search history.

(56) References Cited

U.S. PATENT DOCUMENTS

| 2017/0351363 | A1* | 12/2017 | Lee ........................... C08J 7/043 |
| 2017/0371453 | A1* | 12/2017 | Nakayama ............... H05K 1/09 |
| 2020/0013831 | A1 | 1/2020 | Zeng et al. |

FOREIGN PATENT DOCUMENTS

| CN | 103729089 A | 4/2014 |
| CN | 104850295 A | 8/2015 |
| CN | 105739759 A | 7/2016 |
| CN | 206563955 U | 10/2017 |
| CN | 109032410 A | 12/2018 |
| CN | 209962232 U | 1/2020 |
| CN | 111665974 A | 9/2020 |
| CN | 111831159 A | 10/2020 |
| CN | 111880686 A | 11/2020 |
| JP | 2014194655 A | 10/2014 |
| TW | 202111508 A | 3/2021 |
| TW | 202111509 A | 3/2021 |

OTHER PUBLICATIONS

First Office Action issued in counterpart Chinese Patent Application No. 202111308310.6, dated Apr. 20, 2022.
Notification to Grant Patent Right for Invention issued in counterpart Chinese Patent Application No. 202111308310.6, dated May 12, 2022.

* cited by examiner

*Primary Examiner* — Deeprose Subedi
(74) *Attorney, Agent, or Firm* — Westbridge IP LLC

(57) ABSTRACT

Disclosed are a metal mesh structure for a capacitive touch screen, a touch display device and a mobile terminal. The metal mesh structure includes: a first metal mesh layer, a first coating layer, a first optical adhesive layer, a second metal mesh layer and a second coating layer which are arranged in sequence. The first coating layer is coated on the first metal mesh layer, a thickness of the first coating layer is smaller than that of the first metal mesh layer, the second coating layer is coated on the second metal mesh layer, and a thickness of the second coating layer is smaller than that of the second metal mesh layer.

10 Claims, 3 Drawing Sheets

METAL MESH STRUCTURE, TOUCH DISPLAY DEVICE AND MOBILE TERMINAL

CROSS-REFERENCE TO RELATED APPLICATIONS

This application claims priority to Chinese Patent Application No. 202111308310.6, filed on Nov. 5, 2021, the entire contents of which are incorporated herein by reference.

TECHNICAL FIELD

The present application relates to the field of optical thin films, and in particular, to a metal mesh structure for a capacitive touch screen, a touch display device and a mobile terminal.

BACKGROUND

With the development of touch technology, the traditional resistive touch screen is gradually being replaced by the thinner capacitive touch screen with better touch performance. The metal mesh has been widely used in many capacitive touch screens in the industry.

At present, there are two kinds of metal mesh technologies being widely used in the industry: copper metal mesh technology and silver halide nanoparticles metal mesh technology. In these two technologies, a metal mesh electrode is made on a polyester resin (PET) substrate, and then a transparent conductive film of PET is attached to a glass cover plate by optical adhesive layer (OCA) film pasting process, forming a capacitive touch screen with a Glass-Film-Film (GFF) or GF2 structure.

As shown in FIG. 1, the GFF structure includes an upper line Indium Tin Oxide (ITO) thin film layer, an upper OCA optical adhesive layer, and a lower line ITO thin film layer from top to bottom. However, this technology has the following disadvantages:

(1) Thin Copper Film and Thick Substrate

This structure needs to adopt ITO thin film layer, that is, firstly plating a metal film on a plastic substrate (such as PET), and then patterning a metal layer into a metal electrode by using a photo process, which will not only lead to problems, such as high production cost, slow production efficiency and the like, but also involve a vacuum coating process, and the thickness and types of the metal plating layer and the substrate in the ITO thin film layer are strictly limited, so that the thickness of the copper film is very thin and kept below 2 μm. Accordingly, in order to limit the bending of the copper film, the PET substrate is set to be very thick and kept at about 100 μm.

(2) Low Transmittance

Because the transmittance of PET substrate in the visible light range is lower than 92%, its composite transmittance is lower after the metal mesh conductive layer is prepared on this transparent PET substrate, and it is difficult to obtain a transparent conductive thin film with a high transmittance and a low resistance.

(3) High Reflectivity

The reflectivity of PET substrate in the visible light range is very high, which will significantly reduce the graphic authenticity of the touch screen after it has been made. Therefore, it is usually necessary to bond the glass with the function of reducing the reflectivity, which will not only increase the cost of the touch screen, but also increase the weight of the touch screen and reduce the flexibility of the touch screen, thus actually not completely solving the problem of the weight and panel thickness of middle and large-size screens.

SUMMARY

The present application aims to provide a capacitive touch screen, which may solve the problems of thin copper film, thick substrate, low transmittance and high reflectivity existing in the prior touch screen, effectively improving the economy and conductivity of the product, and achieving the lightness and thinness of the touch screen.

According to an aspect of the present application, a metal mesh structure for a capacitive touch screen is provided, including a first metal mesh layer, a first coating layer, a first optical adhesive layer, a second metal mesh layer and a second coating layer which are arranged in sequence, wherein the first coating layer is coated on the first metal mesh layer, a thickness of the first coating layer is smaller than a thickness of the first metal mesh layer, the second coating layer is coated on the second metal mesh layer, and a thickness of the second coating layer is smaller than a thickness of the second metal mesh layer.

In some embodiments, the first metal mesh layer is obtained by performing a photolithography process on a first copper foil coated with the first coating layer; and the second metal mesh layer is obtained by performing the photolithography process on a second copper foil coated with the second coating layer.

In some embodiments, the thicknesses of the first metal mesh layer and the thickness of the second metal mesh layer are between 0.5 μm and 100 μm.

In some embodiments, the thicknesses of the first coating layer and the thickness of the second coating layer are between 0.5 μm and 50 μm.

In some embodiments, materials of the first coating layer and the second coating layer include, but are not limited to, acrylic resin, ethylene-acetic acid copolymer and polyvinyl butyral.

In some embodiments, the metal mesh structure further includes:
- a first blackening layer covering the first metal mesh layer;
- a third coating layer covering the first blackening layer;
- a second blackening layer covering the second metal mesh layer; and
- a fourth coating layer covering the second blackening layer.

In some embodiments, materials of the first coating layer, the second coating layer, the third coating layer and the fourth coating layer are the same.

In some embodiments, a thicknesses of the third coating layer and a thicknesses of the fourth coating layer are between 0.1 μm and 50 μm.

According to another aspect of the present application, a touch display device is provided, including a glass cover plate, a second optical adhesive layer, a metal mesh structure as described above, a third optical adhesive layer and a display panel module which are arranged in sequence.

According to another aspect of the present application, a mobile terminal is provided, including the touch display device as described above.

The present application provides a metal mesh structure for a capacitive touch screen, which may solve the problems of thin copper film, thick substrate, low transmittance and high reflectivity existing in the prior touch screen, effectively improving the economy and conductivity of the product. Also, compared with the prior metal mesh structure, the structure of the present application has no polymer substrate, so the overall thickness is obviously thinner, improving the total transmittance of the thin film and achieving the lightness and thinness of the touch screen.

BRIEF DESCRIPTION OF THE DRAWINGS

The accompanying drawings illustrated here are used to provide a further understanding of the present application and form a part of this application. The illustrative embodiments of the present application and their descriptions are used to explain the application, and do not constitute undue limitations on the application. In the accompanying drawings.

DETAILED DESCRIPTION OF THE EMBODIMENTS

It should be noted that the embodiments in this application and the features in the embodiments may be combined with each other without conflict. Hereinafter, the present application will be described in detail with reference to the drawings in connection with the embodiments.

Figure 1:
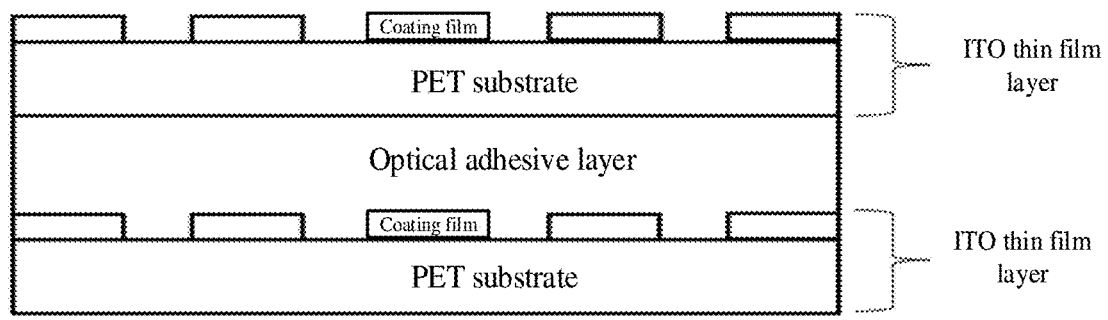
FIG. 1 is a schematic view of a Glass-Film-Film (GFF) structure of a capacitive touch screen in the prior art.
Figure 2:
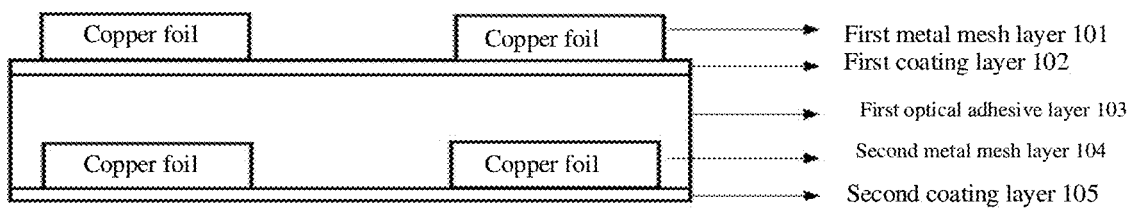
FIG. 2 is a schematic view of a metal mesh structure for a capacitive touch screen according to an embodiment of the present application.

The embodiment of the present application provides a metal mesh structure for a capacitive touch screen. FIG. 1 is a schematic view of a metal mesh structure for a capacitive touch screen according to an embodiment of the present application. As shown in FIG. 1, the metal mesh structure 100 includes a first metal mesh layer 101, a first coating layer 102, a first optical adhesive layer 103, a second metal mesh layer 104 and a second coating layer 105 which are arranged in sequence, wherein the first coating layer 102 is coated on the first metal mesh layer 101, a thickness of the first coating layer 102 is smaller than that of the first metal mesh layer 101, the second coating layer 105 is coated on the second metal mesh layer 104, and a thickness of the second coating layer 105 is smaller than that of the second metal mesh layer 104.

It should be noted that the materials of the first coating layer 102 and the second coating layer 105 include, but are not limited to, acrylic resin, ethylene-acetic acid copolymer and polyvinyl butyral. Taking acrylic resin coating material as an example, it is a thermoplastic or thermosetting resin coating material or radiation acrylic coating material made of acrylic resin obtained by co-polymerization of (meth) acrylate and styrene with other acrylates.

The coating layers are coated on the first metal mesh layer and the second metal mesh layer by coating technology, which may protect the bottom of the copper foil from being eroded by the reagent in the photolithography process and avoid the side etching or undermining phenomenon and avoid the influence of the reagent layer on the optical adhesive layer during the photolithography process. The metal mesh structure of the present application includes a first metal mesh layer 101, a first coating layer 102, a first optical adhesive layer 103, a second metal mesh layer 104 and a second coating layer 105 from top to bottom, the first coating layer is coated on the first metal mesh layer with a thickness larger than that of the first coating layer, the second coating layer is coated on the second metal mesh layer with a thickness greater than that of the second coating layer. In this way, it can be ensured that there is no need to use any polymer substrate in the whole preparation process, which greatly reduces the waste of resources, and the thickness of the metal mesh layer may be greater than 2 μm.

The structure effectively increases the thickness of the metal mesh layer, reduces the surface resistance of the touch screen, further accelerates the transmission of signals, and reduces the delay of touch control. Also, compared with the prior metal mesh structure, the structure of the present application has no polymer substrate, so the overall thickness is obviously thinner, improving the total transmittance of the thin film and achieving the lightness and thinness of the touch screen.

It should be noted that in the Glass-Film-Film (GFF) structure, if the substrate is too thin, the metal coating film is prone to curling, while if the substrate is too thick, the future trend of lightness and thinness will be lost. Therefore, there is an irreconcilable contradiction between the overall lightness and thinness and eliminating the effect of curling. According to the present application, the first coating layer is coated on the first metal mesh layer with a thickness larger than that of the first coating layer, and even in the case of no substrate bearing, the thickness of the metal mesh layer is enough to eliminate the curl caused by the tension of the coating layer, so that the adverse effects that the upper and lower materials may not be flattened during compounding and wrinkle after compounding may be eliminated while improving the total transmittance of the thin film and achieving the lightness and thinness of the touch screen.

In some embodiments of the present application, it is further clarified that the first metal mesh layer is obtained by performing a photolithography process on a first copper foil coated with the first coating layer, and the second metal mesh layer is obtained by performing the photolithography process on a second copper foil coated with the second coating layer.

In some embodiments of the present application, it is further clarified that the thickness of the first metal mesh layer and the thickness of the second metal mesh layer are between 0.5 μm and 100 μm, and between 2 μm and 100 μm.

Figure 3:
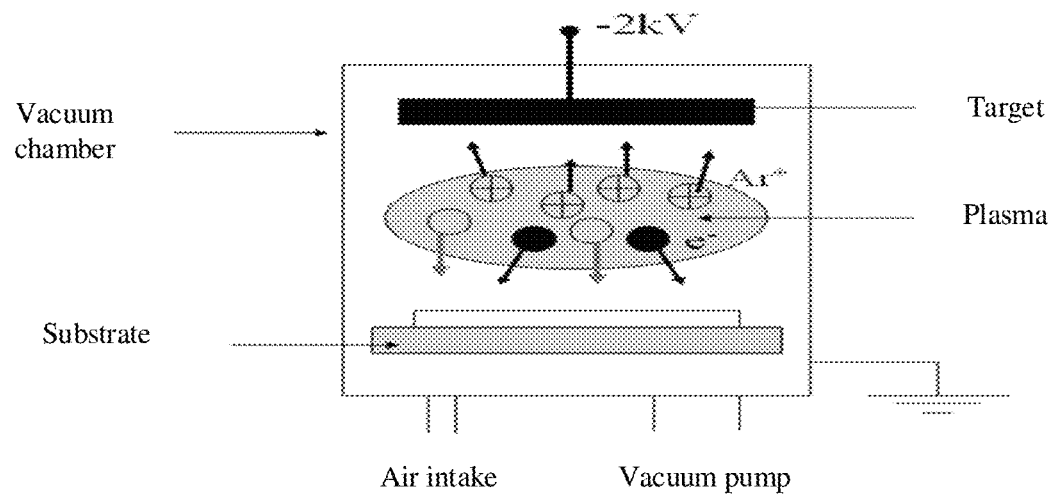
FIG. 3 is a schematic view of the forming process of the vacuum coating in the prior art.

In the prior art, the preparation of ITO thin film layer is to plate a metal layer on a plastic substrate (such as PET), then pattern the metal layer into a metal electrode by using a photo process, and then combine an optical adhesive layer (OCA) with a glass cover plate. Therefore, the thickness of the current metal mesh layer is limited by vacuum coating process, and it is difficult to deposit a copper film more than 2 μm. In order to explain in more detail that the thickness of the metal mesh layer in the prior art cannot reach 2 μm to 100 μm, FIG. 3 shows the forming process of the vacuum coating in the prior art. Firstly, the ions generated by the plasma are used to bombard the copper electrode of the covered material, so that atoms of the covered material are contained in the plasma, and then the film deposition reaction is carried out. Specifically, a negative high voltage is firstly applied to a cathode copper target to accelerate the positively charged ions (generally Ar), then the copper target is bombarded in a high momentum state, and after the momentum exchange, the atoms, the secondary electrons and the like on the surface of the copper target are sputtered out, where the copper atoms are deposited on the surface of the PET substrate to form a thin film, and the secondary electrons are accelerated towards the anode PET substrate, and hit the Ar gas again in the acceleration process, so that more positively charged ions (Ar+) are released, and the positively charged ions are accelerated by the negative high voltage and hit the copper target again, thus repeating this process to prepare the required copper film. Then, the copper layer on the transparent substrate is patterned by the subtraction process of the photo process (coating photoresist-exposure-development-etching-stripping film). Therefore, the thickness of the metal mesh layer in the prior art is limited by the vacuum coating process, and the thickness will not exceed 2 μm.

According to the present application, the coating layer and the metal mesh layer are coated by coating technology, and the thickness of the first metal mesh layer and the thickness of the second metal mesh layer are set between 0.5 μm and 100 μm, especially between 2 μm and 100 μm, which can reduce the surface resistance of the touch screen, accelerate the signal transmission, and reduce the touch delay.

In some embodiments of the present application, it is further clarified that the thicknesses of the first coating layer and the thicknesses of the second coating layer are between 0.5 μm and 50 μm.

As mentioned above, in the prior art, because the transmittance of PET substrate in the visible light range is lower than 92%, its composite transmittance is lower after the copper mesh conductive layer is prepared on this transparent PET substrate, and it is difficult to obtain a transparent conductive thin film with a high transmittance and a low resistance. Meanwhile, the reflectivity of PET substrate in the visible light range is very high, which will significantly reduce the graphic authenticity of the touch screen after it has been made. Therefore, it is necessary to bond the glass with the function of reducing the reflectivity, which will not only increase the cost of the touch screen, but also increase the weight of the touch screen and reduce the flexibility of the touch screen. Also, the metal mesh structure with transparent polymer substrate, such as PET substrate, has the problems of generating iridescent patterns and black vision. Even if the original substrate is replaced by a transparent substrate made of other substrates, such as cycloolefin polymer, cycloolefin copolymer, or high retardation film, these materials will be deformed due to heat accumulation during vacuum sputtering, even if the problems of iridescent patterns and black vision are solved.

Due to the development of the new process, it is different from the existing manufacturing method. In the present application, the thickness of the first coating layer coated on the first metal mesh layer and the thickness of the second coating layer coated on the first metal mesh layer are between 0.5 μm and 50 μm, and after the coating layer and the metal mesh layer are coated by coating technology, it can not only ensure that the metal mesh will not be bent and deformed due to tension, but also ensure the overall thickness to be obviously thinner, improve the total transmittance of the thin film and achieve the lightness and thinness of the touch screen. Because the substrate is replaced in this structure, the problems of iridescent patterns and black vision, as well as deformation, are solved.

Figure 4:
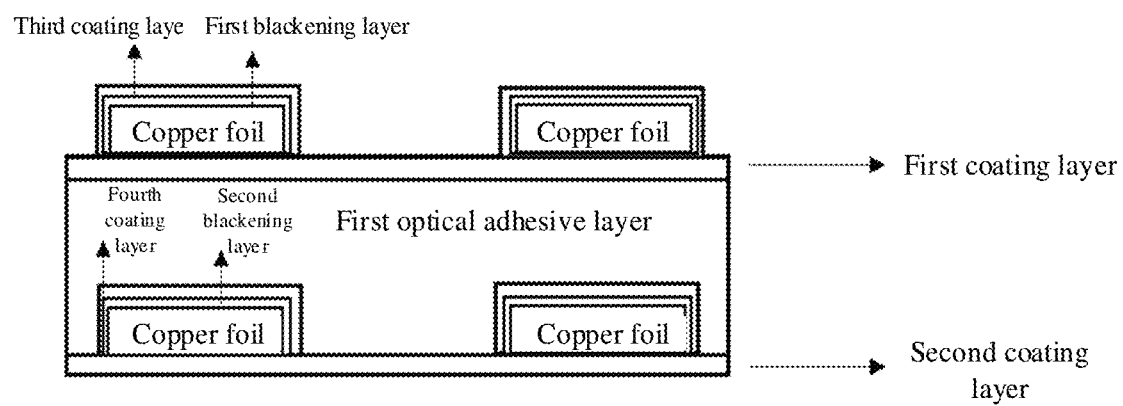
FIG. 4 is a schematic view of a metal mesh structure for a capacitive touch screen according to another embodiment of the present application.

The embodiment of the present application also provides a metal mesh structure for the capacitive touch screen. FIG. 4 is a schematic view of a metal mesh structure for a capacitive touch screen according to an embodiment of the present application. As shown in FIG. 4, the metal mesh structure further includes a first blackening layer covering the first metal mesh layer; a third coating layer covering the first blackening layer; a second blackening layer covering the second metal mesh layer; and a fourth coating layer covering the second blackening layer.

It should be noted that, in this structure, first, the first metal mesh layer and the second metal mesh layer are subjected to surface treatment, and then the first blackening layer and the third coating layer are sequentially formed on the first metal mesh layer, and the second blackening layer and the fourth coating layer are sequentially formed on the second metal mesh layer, wherein the first metal mesh layer, the first blackening layer and the third coating layer constitute a first metal induction electrode layer, and the second metal mesh layer, the second blackening layer and the third coating layer constitute a second metal induction electrode layer.

In some embodiments of the present application, it is further clarified that the materials of the first coating layer, the second coating layer, the third coating layer and the fourth coating layer are the same.

In some embodiments of the present application, it is further clarified that the thickness of the first blackening layer and the thickness of the second blackening layer are between 40 nm and 500 nm, and their materials include, but are not limited to, copper oxide, copper selenide and copper sulfide.

In some embodiments of the present application, it is further clarified that the thicknesses of the third coating layer and the thicknesses of the fourth coating layer are between 0.1 μm and 50 μm, and between 0.5 μm and 50 μm.

A touch display device is further provided in some embodiments of this application, a capacitive touch screen including a glass cover plate, a second optical adhesive layer, a metal mesh structure of this application, a third optical adhesive layer and a display panel module which are arranged in sequence. The foregoing description has clearly disclosed the metal mesh structure of the present application, including a first metal mesh layer 101, a first coating layer 102, a first optical adhesive layer 103, a second metal mesh layer 104 and a second coating layer 105 which are arranged in sequence, wherein the first coating layer 102 is coated on the first metal mesh layer 101, a thickness of the first coating layer 102 is smaller than that of the first metal mesh layer 101, the second coating layer 105 is coated on the second metal mesh layer 104, and a thickness of the second coating layer 105 is smaller than that of the second metal mesh layer 104. In the touch display device, the glass cover plate is connected to the second optical adhesive layer, the other side of the optical adhesive layer is connected to the first metal mesh layer of the metal mesh structure, the first coating layer of the metal mesh structure is connected to one side of the third optical adhesive layer, and the other side of the third optical adhesive layer is connected to the display panel module.

Depending on the type of touch display device TPD, the display panel module may be LCD display panel module, OLED display panel module, Mini LED display panel module, Micro LED display panel module or AMOLED display panel module.

Furthermore, the present application does not limit that the touch display device must be an independent device, and it may also be integrated into an electronic device, such that the electronic device has both touch function and display function. The electronic device may be a smart phone, a tablet computer, a notebook computer, an All-in-One computer, a smart watch, an entrance machine, a Nano blackboard, an intelligent All-in-One machine or a conference machine.

Figure 5:
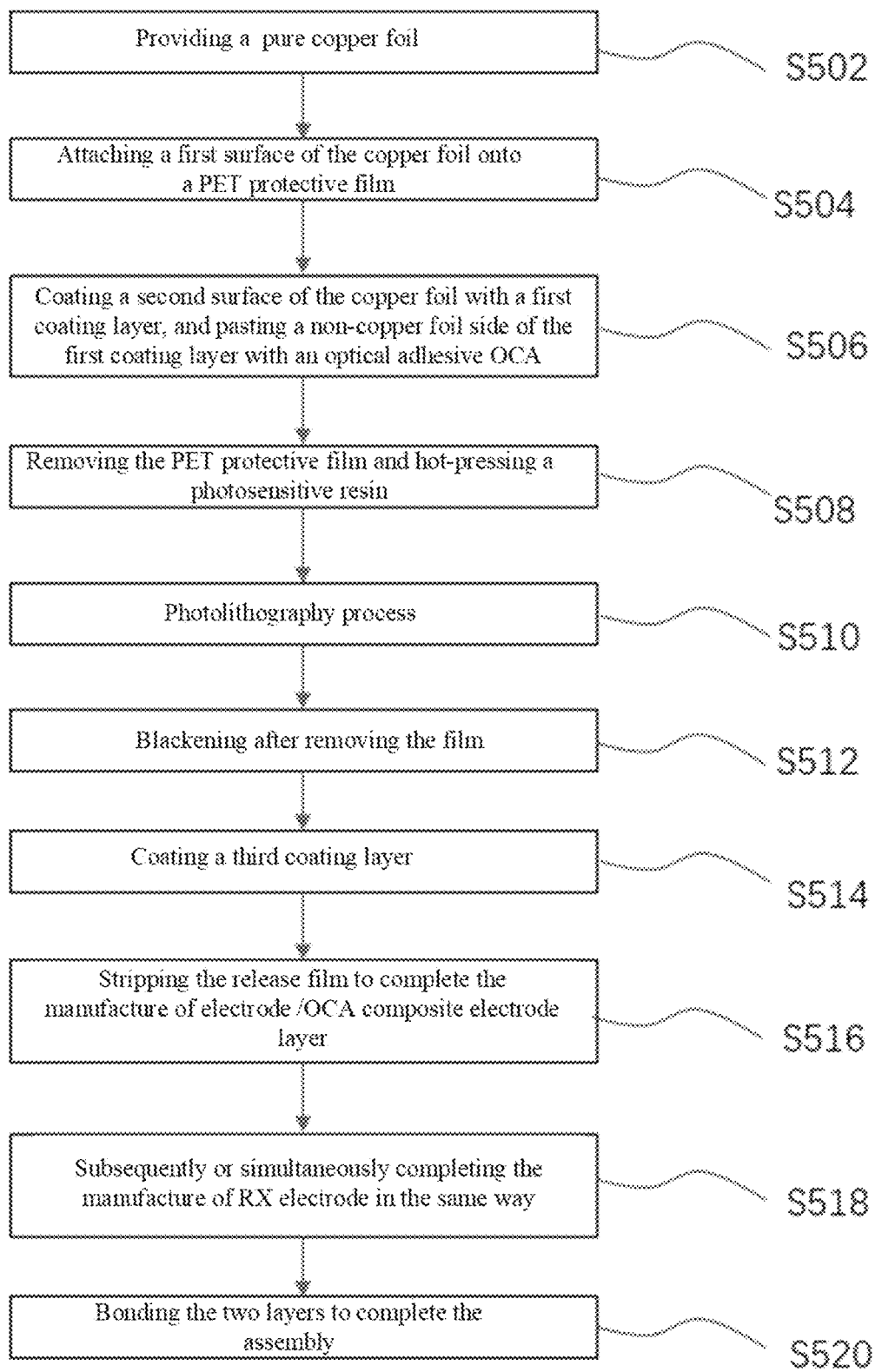
FIG. 5 is a flow chart of a manufacturing method of a metal electrode structure.

According to the FIG. 5, the embodiment of the present application also provides an embodiment of a manufacturing method of a metal electrode structure, which includes the following steps S502 to S520:

S502: providing a pure copper foil, which may be rolled copper foil or electrolytic copper foil with a thickness between 0.5 μm and 100 μm, especially between 2 μm and 100 μm, S504: attaching a first surface of the copper foil onto a PET protective film which plays a supporting role;

S506: coating a second surface of the copper foil with a first coating layer, and pasting a non-copper foil side of the first coating layer with an optical adhesive OCA (the release film is provided with the optical adhesive), where the material of the first coating layer include, but are not limited to, acrylic resin, ethylene-acetic acid copolymer and polyvinyl butyral;

S508: removing the PET protective film and hot-pressing a photosensitive resin;

S510: performing a photolithography process on the product of step S504 to obtain a first metal mesh layer;

S512: removing a resist layer and an oxide layer of the pure copper foil by using an acidic solution; performing the surface treatment on the first metal mesh layer, where the acidic solution may be any of sulfuric acid, nitric acid, hydrochloric acid, formic acid, acetic acid, malic acid, citric acid, a mixture of any two of the above, or a mixture of any two or more of the above; and sequentially forming a first blackening layer and a third coating layer on the first metal mesh layer, where the first blackening layer may be made by a generation method or a replacement method, and may be copper oxide, copper selenide and copper sulfide, and the thickness of the first blackening layer is between 40 nm and 500 nm;

S514: coating a third coating layer on the first blackening layer;

S516: stripping the release film to complete the manufacture of TX electrode/OCA composite electrode layer;

S518: subsequently or simultaneously completing the manufacture of an electrode layer of RX electrode in the same way;

S520: bonding the two layers to complete the assembly.

In summary, the present application provides a metal mesh structure for a capacitive touch screen, which may solve the problems of thin copper film, thick substrate, low transmittance and high reflectivity existing in the prior touch screen, effectively improving the economy and conductivity of the product. Also, compared with the prior metal mesh structure, the application has no polymer substrate, so the overall thickness is obviously thinner, improving the total transmittance of the thin film and achieving the lightness and thinness of the touch screen.

The above embodiments are only the preferred embodiments of the present application, and are not intended to limit the present application. For those skilled in the art, the application may be modified and varied. Any modification, equivalent substitution, improvement, etc. made within the spirit and principle of the application shall be included in the scope of protection of the present application.

What is claimed is:

1. A metal mesh structure for a capacitive touch screen, comprising a first metal mesh layer, a first coating layer, a first optical adhesive layer, a second metal mesh layer and a second coating layer which are arranged in sequence,
wherein the first coating layer is coated on the first metal mesh layer, a thickness of the first coating layer is smaller than a thickness of the first metal mesh layer, the second coating layer is coated on the second metal mesh layer, and a thickness of the second coating layer is smaller than a thickness of the second metal mesh layer.

2. The metal mesh structure according to claim 1, wherein:
the first metal mesh layer is obtained by performing a photolithography process on a first copper foil coated with the first coating layer; and
the second metal mesh layer is obtained by performing the photolithography process on a second copper foil coated with the second coating layer.

3. The metal mesh structure according to claim 1, wherein the thicknesses of the first metal mesh layer and the thickness of the second metal mesh layer are between 0.5 μm and 100 μm.

4. The metal mesh structure according to claim 1, wherein the thicknesses of the first coating layer and the thickness of the second coating layer are between 0.5 μm and 50 μm.

5. The metal mesh structure according to claim 1, wherein materials of the first coating layer and the second coating layer comprise acrylic resin, ethylene-acetic acid copolymer and polyvinyl butyral.

6. The metal mesh structure according to claim 1, further comprising:
a first blackening layer covering the first metal mesh layer;
a third coating layer covering the first blackening layer;
a second blackening layer covering the second metal mesh layer; and
a fourth coating layer covering the second blackening layer.

7. The metal mesh structure according to claim 6, wherein materials of the first coating layer, the second coating layer, the third coating layer and the fourth coating layer are the same.

8. The metal mesh structure according to claim 6, wherein a thicknesses of the third coating layer and a thicknesses of the fourth coating layer are between 0.1 μm and 50 μm.

9. A touch display device, comprising a glass cover plate, a second optical adhesive layer, the metal mesh structure according to claim 1, a third optical adhesive layer and a display panel module which are arranged in sequence.

10. A mobile terminal comprising the touch display device according to claim 9.

* * * * *